Patented Aug. 28, 1923.

1,466,587

UNITED STATES PATENT OFFICE.

CHARLES H. HOLLUP, OF MILWAUKEE, WISCONSIN, ASSIGNOR, BY DIRECT AND MESNE ASSIGNMENTS, TO INTERNATIONAL WELDING ENGINEERING CORPORATION, OF CHICAGO, ILLINOIS, A CORPORATION OF ILLINOIS.

WELDING PROCESS AND MEANS.

No Drawing.　　Application filed December 29, 1917.　Serial No. 209,392.

*To all whom it may concern:*

Be it known that I, CHARLES H. HOLLUP, a citizen of the United States, residing at Milwaukee, in the county of Milwaukee and State of Wisconsin, have invented a certain new and useful Improvement in Welding Processes and Means, of which the following is a full, clear, concise, and exact description.

My invention relates to improvements in welding. Autogenous processes have been developed heretofore, the welding being effected in one case by means of a gas torch and in the other case by means of an electric arc. In the case of electric welding, a metal rod is held in the hand by means of a suitable holder, the rod being connected to one terminal of a circuit and the work to another terminal. An arc is then struck by touching the rod to the work after which the metal of the rod is fused onto the work, the rod being gradually consumed during the process. In like manner, gas welding has been effected by applying the gas flame or blow pipe flame to a rod in order to fuse it onto the work.

There has been considerable development in both of these types of welding and particularly in the case of electric welding the development has been very rapid in the last few years. However, with both forms of welding and particularly in the case of electric welding, it has been very difficult, if not impossible, to weld certain special kinds of steel onto other steels. For example, it has been very difficult to weld manganese steel to high carbon steel, or manganese steel to manganese steel, or to weld nickel steel, vanadium steel or high carbon steel to the same or other special steels or different grades of mild steel or of iron.

The object of the present invention is to provide an improved process and means whereby practically all of these different types of steel may be successfully welded to any other type.

In the case of manganese steel, with which great difficulty has been experienced heretofore, it is probable that the failure of the welds has been due to the fact that the manganese steel oxidizes rapidly at the high temperature of the electric arc or the gas flame.

The present improvement is based on providing means for excluding air from the weld to a greater or less extent during the fusing operation whereby the physical properties of the final weld are not impaired by oxidization.

A further object of the invention consists in overcoming the difficulties encountered in applying the substance which is used to exclude oxygen.

The invention may be carried out in one form by immersing the rod in a suitable liquid prior to the welding operation or by applying the compound thereto in some other manner.

In the case where a liquid is used, I have obtained very satisfactory results by preparing a solution using about one pound of silica flour with one pint of silicate of soda. The rod is dipped into this solution, then dried preferably in a vertical position, after which the welding operation is carried out by means of an electric arc or gas flame. As the rod is consumed, the coating thereof is also consumed in about the same ratio. This action appears to be due to the fact that the silicate of soda, which acts as a binder for the silica flour, insures that the rod will retain its coating down to the end which is being fused. In other words, the coating does not burn back exposing the bare end of the rod. As a result, the weld is of uniform texture. The metal from the end of the rod is deposited on the work and the coating flows with it in uniform proportion, resulting in uniformity in the weld. Oxidization of the metal, as it travels through the arc, appears to be prevented by the said coating compound which travels with it. The completed weld is also protected against excessive oxidization.

One difficulty with electric arc welding, as heretofore practiced, has been due to the fact that the end of the rod, being the hottest part thereof has the highest resistance, as a result of which the arc sometimes jumps back to a point above the end of the rod. Under these circumstances, pieces of metal of appreciable size are fused off and carried over onto the work resulting in an imperfect fusion and consequently an unsatisfactory weld. The coating compound referred to greatly minimizes this difficulty in that it is an insulator and tends to confine the arc to the tip of the rod.

The coating compound referred to adheres very firmly to the rod, being in effect cemented thereto and therefore it does not drop off or crack off with ordinary handling. This enables a large number of rods to be coated at some convenient point and then distributed instead of requiring each rod to be coated at the place where the work is to be performed. The coating compound need not necessarily be in the form of a liquid. Furthermore, its usefulness is not necessarily limited to that type of welding wherein there is no application of external pressure to the parts to be welded as distinguished from a forging operation, butt welding or spot welding operation, for example.

One important application of the process described herein, is the repair of railway tracks by building up worn rails by depositing metal thereon and by repairing or building up frogs, switches, cross-overs, etc. Worn parts of car wheels, driving wheel tires, journals of car and locomotive axles may be repaired by building them up with manganese steel.

Having thus described my invention, what I claim as new and desire to secure by Letters Patent of the United States is:

1. The method of welding which consists in coating one of the metals with silica and silicate of soda and thereafter fusing said metal onto the other metal.

2. The method of welding which consists in immersing one of the metals in a liquid containing silica flour and silicate of soda in the proportion of one pound of the former to one pint of the latter and thereafter fusing said metal.

3. A coating for metal to be used in welding consisting of silica flour and silicate of soda in a proportion of one pound of the former to one pint of the latter.

4. An electrode for use in electric arc welding and repairing comprising a metal rod having a coating consisting principally of silica, preferably in the form of silicate of soda.

5. An electrode for use in electric arc welding and repairing comprising a metal rod having a coating consisting principally of an oxygen containing compound of silicon, preferably in the form of silicate of soda.

6. An electrode for use in electric arc welding and repairing comprising a metal rod having a coating consisting principally of an oxygen containing compound of silicon, preferably in the form of a silicate.

7. An electrode for use in electric arc welding and repairing comprising a metal rod having a coating consisting principally of an oxygen containing compound of silicon, preferably in the form of an alkali metal silicate.

8. A welding electrode comprising a fusible rod having a coating containing an oxygen containing compound of silicon of such characteristics and in such quantity as to leave on the finished weld no slag heavy enough to require it to be chipped off.

9. A welding electrode comprising a fusible rod having a coating consisting of a silicate and an oxide of silicon.

10. A welding electrode comprising a fusible rod having a coating containing silicate of soda and a second substance cooperating therewith to produce a strong homogeneous weld having no slag thereon heavy enough to require chipping off.

11. An electrode for welding manganese steel comprising a rod of suitable composition having a coating adhering thereto and consisting of silicate of soda and oxide of silicon in such proportions as to result in a strong weld substantially free from a slag coating.

12. A welding electrode comprising a fusible rod having a coating containing silicate of soda and a second substance associated therewith to aid in producing a strong homogeneous weld, said coating adhering to said rod without mechanical fastening means and in such small quantities as to permit successive layers to be welded without removing such resultant scale as may form on such successive layers.

13. A metal arc welding electrode having a coating of appreciable thickness consisting principally of a silicate having a high electron emissivity when heated, the resultant scale forming on the finished weld tending to peel off as the metal cools.

In witness whereof, I hereunto subscribe my name this 27th day of December A. D., 1917.

CHARLES H. HOLLUP.